(12) United States Patent
El-Maraghi et al.

(10) Patent No.: US 8,705,867 B2
(45) Date of Patent: Apr. 22, 2014

(54) DEVICES AND METHODS FOR PROCESSING IMAGES USING SCALE SPACE

(75) Inventors: Thomas F. El-Maraghi, Ontario (CA); Richard J. Rzeszutek, Ontario (CA); Dimitrios Androutsos, Ontario (CA); Raymond Phan, Ontario (CA); Samuel Zhou, Ontario (CA)

(73) Assignee: IMAX Corporation, Mississauga, ON ( * ) Notice: Subject to any disclaimer, the term of this patent is extended or adjusted under 35 U.S.C. 154(b) by 335 days.

(21) Appl. No.: 13/129,864

(22) PCT Filed: Dec. 11, 2009

(86) PCT No.: PCT/IB2009/007723
§ 371 (c)(1),
(2), (4) Date: May 18, 2011

(87) PCT Pub. No.: WO2010/067191
PCT Pub. Date: Jun. 17, 2010

(65) Prior Publication Data
US 2011/0229024 A1    Sep. 22, 2011

Related U.S. Application Data

(60) Provisional application No. 61/201,531, filed on Dec. 11, 2008.

(51) Int. Cl.
*G06K 9/48* (2006.01)
*G09G 5/02* (2006.01)

(52) U.S. Cl.
USPC .......................... 382/199; 382/298; 345/604

(58) Field of Classification Search
USPC ......... 382/199, 167, 168, 236, 232, 162, 300, 382/190, 217, 195, 197, 282, 294, 256, 257, 382/173, 201, 293, 133, 154, 298; 345/431, 345/138, 153–154, 589, 600–605, 474, 473, 345/629; 358/518–525, 500; 206/497, 583; 717/108; 707/999.103, 999.101, 707/999.102

See application file for complete search history.

(56) References Cited

U.S. PATENT DOCUMENTS 6,366,692 B1 *  4/2002  Acharya ..................... 382/162
6,717,698 B1 *  4/2004  Lee .............................. 358/1.9

(Continued)

FOREIGN PATENT DOCUMENTS

EP    1865460    12/2007
EP    2003612    12/2008

(Continued)

OTHER PUBLICATIONS

Agarwala et al., "Keyframe-Based Tracking for Rotoscoping and Animation", ACM Transactions on Graphics (ToG), Special Issue: Proceedings of the 2004 Siggraph Conference Session: Interacting With Images, vol. 23, Issue 3, 2004, pp. 584-591.

(Continued)

*Primary Examiner* — Sheela Chawan
(74) *Attorney, Agent, or Firm* — Kilpatrick Townsend & Stockton LLP

(57) ABSTRACT

Certain embodiments relate to processing images by creating scale space images from an image and using them to identify boundaries of objects in the image. The scale space images can have varying levels of detail. They are used to determine a potential map, which represents a likelihood for pixels to be within or outside a boundary of an object. A label estimating an object boundary can be generated and used to identify pixels that potentially may be within the boundary. An image with object boundaries identified can be further processed before exhibition. For example, the images may be two-dimensional images of a motion picture. Object boundaries can be identified and the two-dimensional (2D) images can be processed using the identified object boundaries and converted to three-dimensional (3D) images for exhibition.

30 Claims, 8 Drawing Sheets

(56) References Cited

U.S. PATENT DOCUMENTS

| | | | | |
|---|---|---|---|---|
| 7,162,082 | B2* | 1/2007 | Edwards | 382/173 |
| 7,831,094 | B2* | 11/2010 | Gupta et al. | 382/190 |
| 8,260,048 | B2* | 9/2012 | Jin | 382/173 |
| 2005/0232488 | A1* | 10/2005 | Lee et al. | 382/190 |
| 2009/0324087 | A1 | 12/2009 | Kletter | |

FOREIGN PATENT DOCUMENTS

| | | |
|---|---|---|
| JP | 2006309749 | 11/2006 |
| JP | 2007272536 | 10/2007 |
| JP | 2007307358 | 11/2007 |
| WO | 9919828 | 4/1999 |

OTHER PUBLICATIONS

Agarwala, "SnakeToonz: A Semi-Automatic Approach to Creating Cel Animation from Video", In NPAR 2002: Second International Symposium on Non Photorealistic Animation and Rendering, pp. 139-ff.

Barrett et al., "Interactive Live-Wire Boundary Extraction", Medical Image Analysis, vol. 1, No. 4, Sep. 1997, pp. 331-341.

Boykov et al., "An Experimental Comparison of Min-Cut/Max-Flow Algorithms for Energy Minimization in Vision", IEEE Transactions on Pattern Analysis and Machine Intelligence (TPAMI-0120-0603) first submitted in May, 2002, 34 pages.

Boykov et al., "Fast Approximate Energy Minimization via Graph Cuts", IEEE Transactions on Pattern Analysis and Machine Intelligence, vol. 23, No. 11, Nov. 2001, pp. 1222-1239.

Boykov et al., "Graph Cuts and Efficient N-D Image Segmentation", International Journal of Computer Vision, vol. 70, No. 2, 2006, pp. 109-131.

Boykov et al., "Interactive Graph Cuts for Optimal Boundary & Region Segmentation of Objects in N-D Images", Proceedings of Internation Conference on Computer Vision, Vancouver, Canada, vol. I, Jul. 2001, pp. 105-112.

Boykov et al., "Interactive Organ Segmentation using Graph Cuts", Proceedings of Medical Image Computing and Computer-Assisted Intervention—MICCAI 2000, Third International Conference, Pittsburgh, Pennsylvania, USA, Oct. 11-14, 2000, pp. 276-286.

Bray et al., "Posecut: Simultaneous Segmentation and 3D Pose Estimation of Humans using Dynamic Graph-Cuts", Computer Vision—ECCV 2006, 9th European Conference on Computer Vision, Graz, Austria, May 7-13, 2006, Proceedings, Part II, pp. 642-655.

Burt et al., "The Laplacian Pyramid as a Compact Image Code", IEEE Transactions on Communications, vol. 31, No. 4, Apr. 1983, pp. 532-540.

Changxian et al., "Morphological thinning based on image's edges", International Conference on Communication Technology, ICCT'98, pp. SI6-14-1 to SI6-14-5.

Chuang et al., "A Bayesian Approach to Digital Matting", Proceedings of Computer Vision and Pattern Recognition (CVPR 2001), vol. II, pp. 264-271.

Chuang et al., "Video Matting of Complex Scenes", ACM Transactions on Graphics (Proceedings of ACM Siggraph 2002) vol. 21, No. 3, Jul. 2002, pp. 243-248.

Dyer, "Multiscale image understanding", Computer Sciences Technical Report #679, Dec. 1986, 40 pages.

European Patent Application EP09831535.1, "Response to Rule 161(2) and 162 EPC Communication", filed Jan. 23, 2012 (24 pages).

European Patent Application EP09831535.1, "Rule 161(2) and 162 EPC Communication", mailed Jul. 29, 2011 (2 pages).

Falcao et al., "An Ultra-Fast User-Steered Image Segmentation Paradigm: LiveWire on the Fly", IEEE Transactions on Medical Imaging, vol. 19, No. 1, Jan. 2000, pp. 55-62.

Felzenszwalb et al., "Efficient Graph-Based Image Segmentation", International Journal of Computer Vision, vol. 59, No. 2, Sep. 2004, 26 pages.

Garcia et al., "Contour Tracking for Rotoscoping Based on Trajectories of Feature Points", ECCV Workshop on Statistical Methods in Multi-Image and Video Processing (SMVP), Graz, Austria, May 2006, 9 pages.

Giaccone et al., "Creating Virtual Scenes using Active Contours and Global Motion Estimation", Proceedings of the Fourteenth International Conference on Pattern Recognition. vol. 2. IEEE Conference Publications, Aug. 16-20, 1998, pp. 1505-1507.

Grady, "Random Walks for Image Segmentation", IEEE Transactions on Pattern Analysis and Machine Intelligence, vol. 28, No. 11, Nov. 2006, pp. 1-17.

Grady et al., "Random Walks for Interactive Alpha-Matting", Proceedings of Visualization, Imaging, and Image Processing, vol. 2005, 2005, pp. 423-429.

He et al., "Locality Preserving Projections", Proceedings of Advances in Neural Information Processing Systems, vol. 16, Vancouver, Canada, Dec. 2003, 8 pages.

Hillman et al., "Alpha Channel Estimation in High Resolution Images and Image Sequences", IEEE Computer Society Conference on Computer Vision and Pattern Recognition (CVPR 2011), vol. I, Kauai, Hawaii, Dec. 11-13, 2001, pp. 1063-1068.

Hong et al., Compact region extraction using weighted pixel linking in a pyramid, IEEE Transactions on Pattern Analysis and Machine Intelligence, Mar. 1984, pp. 222-229.

Kort, "Computer Aided Inbetweening", Proceedings of the 2nd International Symposium on Non-Photorealistic Animation and Rendering, 2002, pp. 125-132.

Lam et al., "Thinning Methodologies—A Comprehensive Survey", IEEE Transactions on Pattern Analysis and Machine Intelligence, vol. 14, No. 9, Sep. 1992, pp. 869-885.

Levin et al., "A Closed Form Solution to Natural Image Matting", IEEE Transactions on Pattern Analysis and Machine Intelligence, vol. 30, Issue 2, Feb. 2008, 8 pages.

Mitsunaga et al., "AutoKey: Human Assisted Key Extraction", Proceedings of ACM Siggraph 1995, 1995, pp. 265-272.

Mortensen et al., "Intelligent Scissors for Image Composition", Proceedings of the 22nd Annual Conference on Computer Graphics and Interactive Techniques, ACM, Sep. 1995, pp. 191-198.

Mortensen et al., "Toboggan-Based Intelligent Scissors with a Four-Parameter Edge Model", IEEE Computer Society Conference on Computer Vision and Pattern Recognition, IEEE, vol. 2, 1999, pp. 452-458.

International Patent Application PCT/IB2009/007723, "International Preliminary Report on Patentability", mailed Jun. 23, 2011 (8 pages).

International Patent Application PCT/IB2009/007723, "International Search Report and Written Opinion", mailed on Apr. 19, 2010 (14 pages).

Porter, "Compositing Digital Images", Computer Graphics, vol. 18, No. 3, Jul. 1984, pp. 253-259.

Rother et al., ""GrabCut"—Interactive Foreground Extraction using Iterated Graph Cuts", ACM Transactions on Graphics (TOG), vol. 23, No. 3, Aug. 2004, pp. 309-314.

Ruzon et al., "Alpha Estimation in Natural Images", Proceedings of IEEE Conference on Computer Vision and Pattern Recognition, vol. 1, 2000, pp. 18-25.

Smith et al., "Blue Screen Matting", Proceedings of the 23rd Annual Conference on Computer Graphics and Interactive Techniques, ACM, Aug. 1996, pp. 259-268.

Sun et al., "Flash Matting", ACM Transactions on Graphics, vol. 25, No. 3, 2006, pp. 772-778.

Sun et al., "Poisson Matting", ACM Transactions on Graphics (Tog), Special Issue: Proceedings of the 2004 Siggraph Conference Session: Interacting With Images, vol. 23, Issue 3, 2004, pp. 315-321.

Vogiatzis et al., "Multi-view Stereo via Volumetric Graph-cuts", IEEE Computer Society Conference on Computer Vision and Pattern Recognition, CVPR 2005, vol. 2, Jun. 2005, pp. 391-398.

Wang et al., "An Iterative Optimization Approach for Unified Image Segmentation and Matting", Tenth IEEE International Conference on Computer Vision, ICCV 2005, vol. 2, Oct. 2005, pp. 936-943.

(56) References Cited

OTHER PUBLICATIONS

Wang et al., "Interactive Video Cutout", ACM Transactions on Graphics, vol. 24, No. 3, Jul. 2005, pp. 585-594.

Wang et al., "Optimized Color Sampling for Robust Matting", IEEE Conference on Computer Vision and Pattern Recognition, CVPR 2007, Jun. 2007, pp. 1-8.

Wang et al., "Soft Scissors: An Interactive Tool for Realtime High Quality Matting", ACM Transactions on Graphics (ToG), vol. 26, No. 3, Aug. 2007, 6 pages.

Wexler et al., "Image-based Environment Matting", Proceedings of the 13th Eurographics Workshop on Rendering, Eurographics Association, Jul. 2002, pp. 279-290.

Zongker et al., "Environment Matting and Compositing", Proceedings of the 26th Annual Conference on Computer Graphics and Interactive Techniques, Jul. 1999, pp. 205-214.

Sporring et al., "Gaussian Scale-Space Theory", Springer, 1997, (entire book).

Fujiyoshi, "Gradient-Based Feature Extraction-SIFT and HOG", IPSJ SIG Technical Report, vol. 2007, No. 87, Sep. 3, 2007, p. 211-224.

Japanese Patent Application No. 2011-540232, Office Action, mailed Sep. 3, 2013, 11 pages.

Chinese Patent Application No. 200980149967.3, "Office Action", mailed May 13, 2013 (9 pages).

\* cited by examiner

DEVICES AND METHODS FOR PROCESSING IMAGES USING SCALE SPACE

CROSS REFERENCE TO RELATED APPLICATIONS

This application is a U.S. national phase patent application under 35 U.S.C. 371 of International Patent Application No. PCT/IB2009/007723 titled "Devices and Methods for Processing Images Using Scale Space" and filed Dec. 11, 2009, which claims benefit of priority under PCT Article 8 of U.S. Provisional Application No. 61/201,531, titled "Scale-space Random Walks for Rotoscoping" filed on Dec. 11, 2008. Both applications are incorporated herein by reference in their entireties.

FIELD OF THE DISCLOSURE

This disclosure relates generally to image processing and, more particularly, to processing images using scale space representations of the image.

BACKGROUND

Processing images for motion pictures or otherwise can include identifying objects in one or more frames. The objects can be identified by determining object boundaries. An object boundary can be identified using rotoscoping. Rotoscoping includes tracing boundaries of objects in a motion picture frame-by-frame via digital means. Rotoscoping can extract digital mattes to allow special effects and other image processing to be applied to the image. Examples of special effects include replacing objects in a scene with other objects generated via a computer, compositing an actor from one scene to another, and changing a two-dimensional (2D) motion picture to a three-dimensional (3D) motion picture. Examples of other image processes include tracking an object in an image sequence and tracking an object in a left and right eye image sequence.

Rotoscoping can be used when other techniques, such as a blue screen method, fail to produce a matte within an acceptable accuracy tolerance. For example, images may include a complex background, such as images using archival footage, for which a blue screen method may fail to produce acceptable results. Rotoscoping can be labor-intensive. Semiautomatic rotoscoping techniques can be used for efficiency. Such techniques include contour-based methods and alpha-channel algorithms.

Contour-based methods can involve a user that specifies a contour in one or more frames and as accurately as possible. The contour is a rough estimate of an object boundary. An energy function is evaluated and an active contour is associated with the boundary based on the rough estimate contour. The energy function is minimized iteratively, producing an optimal contour around the object. In some contour-based methods, stroke matching is performed that includes analyzing cost functions to determine which strokes match certain contours of objects between key frames. The algorithms can output relatively smooth contours and establish correspondence between contours in neighboring frames, but often require a skilled user to delineate an object of interest.

Alpha-channel algorithms can extract soft boundaries of objects by analyzing three regions of color: foreground with respect to the object, background with respect to the object, and blended foreground and background in an intermediate region along a boundary of the object. Alpha-channel algorithms often are applied to individual frames, although application to sequences is also possible.

Alpha-channel algorithms can extract soft boundaries, as well as the alpha value, or transparency, of the value. In some alpha-channel algorithms, a Bayesian approach is applied that models both the foreground and background color distributions with spatially varying sets of Gaussians and that assumes a fractional blending of the foreground and background colors to produce a final output. Other alpha-channel algorithms assume that a clean foreground color is a linear combination of a set of clusters and calculate the color and alpha values by examining pairs of clusters in the foreground and the background.

Still other alpha-channel algorithms perform one or more of: (i) estimate the alpha matte in high resolution images and image sequences by assuming that the clusters are prolate, or cigar-shaped, in the red, green, blue (RGB) color space; (ii) derive a cost function from local smoothness assumptions on foreground and background colors and obtaining a quadratic cost function in terms of alpha by analytically eliminating foreground and background colors; (iii) derive a partial differential equation that relates the gradient of an image to the alpha values and describe an efficient algorithm, providing the alpha values as the solution of the equation; (iv) formulate the problem of natural image matting as one of solving Poisson equations with the matte gradient field and extract mattes using a pair of flash/no-flash images, referred to as "flash matting"; (v) allow construction of environment mattes "on-the-fly," without a need for specialized calibration; (vi) perform environment matting by capturing a description of how the object refracts and reflects light, in addition to capturing foreground objects and the alpha matte, and by placing the foreground object in a new environment using environment compositing. Such alpha-channel algorithms, however, seek to produce soft segmentations without producing hard segmentations, which can result in segmentation that is more accurate.

Another rotoscoping technique is random walks. Random walks is a graphical image segmentation algorithm that attempts to identify a probability that a random walker, starting at some "seed" pixel and traveling to some "sink" pixel, would cross a particular pixel. Edges between pixels can be weighted such that pixels considered similar by some criteria have low edge weights, making it more likely for the walker to cross that edge. Probabilities can be determined as a solution to a combinatorial Dirichlet problem. Random walks can also use Locality Preserving Projections to transform a colorspace so that similar colors, such as those in slow-varying gradients, can be brought together and dissimilar colors can be moved apart. Random walks, however, may be unable to segment images cleanly in the presence of noise, resulting in inaccurate object boundary identifications.

Accordingly, methods, devices, and systems are desired that can identify boundaries of objects efficiently and accurately. Methods, devices and systems are also desirable that can produce hard segmentations and identify object boundaries accurately in the presence of noise.

SUMMARY

Certain aspects and embodiments relate to processing images by creating scale space images from an image and using the scale space images to identify boundaries of objects in the image. Scale space images are a multi-resolution signal representation of an image. The scale space images represent varying levels of detail of the image. An image having object boundaries identified can be further processed before exhibition. For example, the images may be two-dimensional images of a motion picture. Object boundaries can be identified and the two-dimensional (2D) images can be processed using the identified object boundaries to convert the 2D images to three-dimensional (3D) images.

In an embodiment, an image having at least one object is received. A computing device can generate two or more scale space images from the image. The scale space images can be used to determine a potential map. The potential map can represent a likelihood of whether a pixel is within a boundary of the object or outside the boundary of the object. The potential map can be used to identify the boundary of the object.

In some embodiments, the image is converted to a color model. The color model can be a CIE L*a*b* color space.

In some embodiments, the scale space images are generated from the image by converting the image to a scale space using two or more low-pass filters. The low-pass filters can include Gaussian kernels. The different levels of detail can include different degrees of blur.

In some embodiments, the scale space images are generated from the image by converting the image to scale space using one of (i) two or more wavelet filters, or (ii) an edge persevering decomposition process.

In some embodiments, the scale space images can be used to determine, for each pixel of the image, weights. Each weight can be associated with a link. The weights can be determined by determining the links associated with the pixel. A weight for each link associated with the pixel can be determined. The weight for each link can be collected to form the weights for the pixel.

In some embodiments, a label for the image is received. Potential values can be determined from the weights and using the label. Each potential value can represent a likelihood of an associated pixel being within a boundary of the object or being outside the boundary of the object. The potential map can be determined from the potential values by determining a geometric mean the potential values. The potential map can include the geometric mean for the potential values.

In some embodiments, a label can be generated and used to determine the potential map. An object mask for the image is received. An inverted object mask is computed from the object mask for the image. A first distance transform is determined from the inverted object mask. A second distance transform is determined from the object mask. Foreground pixels in the image are identified using the first distance transform. Background pixels in the image are identified using the second distance transform. The label is generated based on the identified foreground pixels and the identified background pixels.

In some embodiments, a label can be generated from an initial potential map. An object mask for the image is received. An inverted object mask from the object mask for the image is computed. The inverted object mask is shrunk using a morphological thinning process. The object mask for the image is shrunk using the morphological thinning process. An initial label is generated based on the shrunk inverted object mask and the shrunk object mask for the image. An initial potential map for the image is determined using the initial label. The label is generated using the initial potential map, the shrunk inverted object mask, and the shrunk object mask.

In some embodiments, the potential map is used to generate an image mask. Two or more key points identifying an estimated boundary of the object are received. A label is computed based on the key points. An image segment is cropped based on the label. A potential map is determined from the image segment. Boundary points are created from the potential map. If a command is received that identifies the boundary points as being unacceptable, a second potential map is computed using new key points. If a command is received that identifies the boundary points as being acceptable, the boundary points are outputted. The image mask can be generated using the boundary points.

In some embodiments, the new key points are a greater number than the key points. Furthermore, the key points identify the estimated boundary of the object in two or more image frames in some embodiments. The boundary points identify the portion of the estimated boundary of the object in one or more image frames located between the two or more image frames.

In some embodiments, the key points identify the estimated boundary of the object in two or more image frames. The first set of new points identify the portion of the estimated boundary of the object in at least one image frame located between the two or more image frames.

In some embodiments, the potential map can be determined by program code stored on a computer-readable medium.

In some embodiments, the potential map can be determined by a scale space engine stored on a computer-readable medium and executed by a processor of a computing device.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

DETAILED DESCRIPTION

Figure 1:
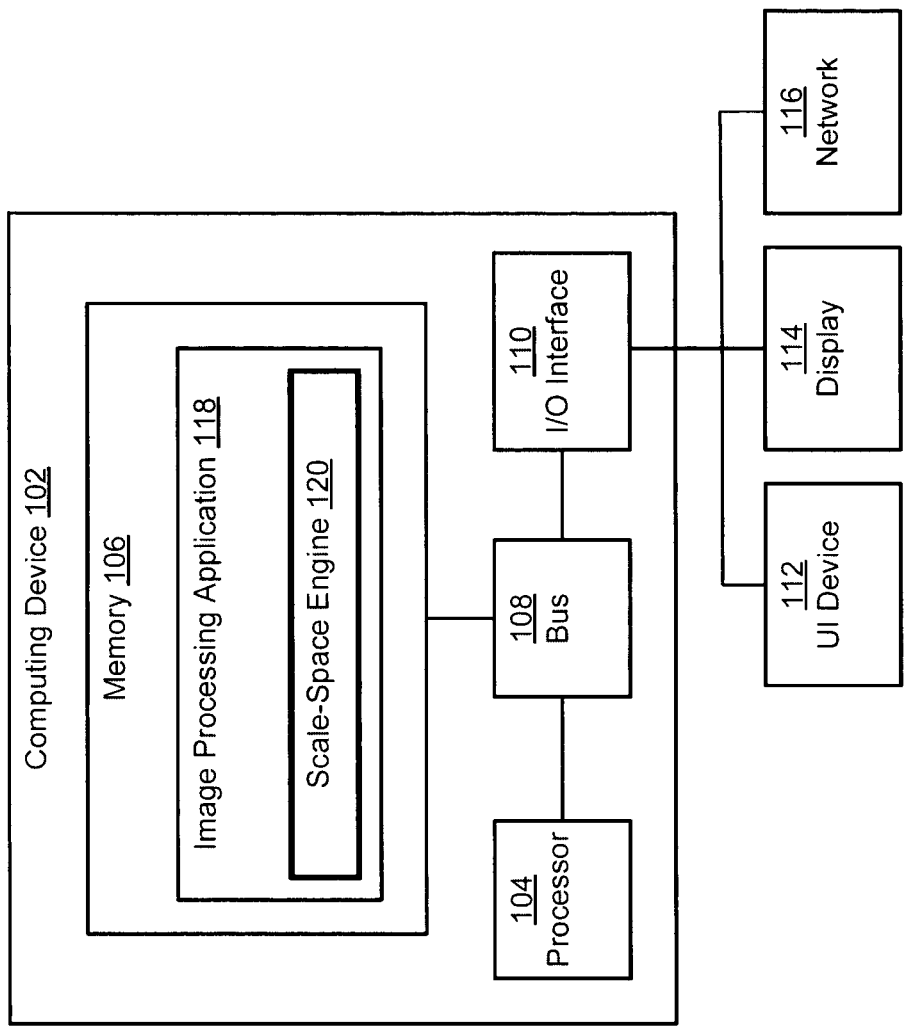
FIG. 1 is a block diagram of a system for generating a potential map that can be used to process an image according to one embodiment of the present invention.

Certain aspects and embodiments relate to processing images by creating scale space images from an image and using the scale space images to identify boundaries of objects in the image. The scale space images may have varying levels of detail. An image having object boundaries identified can be further processed before exhibition. For example, the images may be two-dimensional images of a motion picture. Object boundaries can be identified and the two-dimensional (2D) images can be processed using the identified object boundaries to convert the 2D images to three-dimensional (3D) images.

Scale space images are a multi-resolution signal representation of an image. Scale space images can be formed by filtering the image using filters of varying characteristics, such as different filter kernel sizes. Scale space images formed using filters of varying characteristics can have varying levels of detail. In some embodiments, scale space images are formed by convolving an image with Gaussian kernels having different sizes. Scale space images can correspond with levels. For example, a scale space image can correspond to a level that represents a level of detail in the image.

In some embodiments, scale space images are formed by filtering the image multiple times using different sized filtering components to remove information related to "fine" details in the image. The filtering components may be low-pass filter kernels that have progressively larger sizes. A scale space image generated using a large-sized kernel filter can be a higher level scale space image that includes a lower level of detail. A scale space image generated using a smaller size kernel filter is a lower level scale space image that includes a higher level of detail. In one embodiment, the filters kernels are isometric Gaussian low-pass filter kernels and the resulting scale space images have varying characteristics that include blur.

In some embodiments, the scale space images can be used to compute a three-dimensional graph for each pixel. The pixel can be linked to adjacent pixels of a number of scale space images. A weight can be associated with a link between the pixel and an adjacent pixel. A value of the weight can be determined by the similarity between the pixels.

The scale space images can be used to determine a potential map for the image. For example, the three-dimensional graph can be used to compute a potential map. A potential map may include, for each pixel in the image or a portion of the image, a potential value representing a likelihood of the pixel being within a boundary of an object in the image or being outside the boundary of the object. The potential map can be used to process the image. For example, the potential map can be used to identify a boundary for an image object to allow the object to be modified for 3D exhibition, among other purposes.

In some embodiments, a label for the image can be received to facilitate computing the potential map. A label can identify image pixels that can be candidates for boundary pixels of an object. A label can be associated with a boundary tolerance to ensure true object boundary pixels are contained within the label. A label can be computed based on imprecise boundary pixel information. In some embodiments, a label is received from a human operator using interactive means. An example of a label is a trimap that is drawn around, and that includes, the boundary of an object. A trimap divides image pixels into three groups: pixels that belong to the object (foreground), pixels that are outside the object (background) and pixels between the foreground and the background that may be object boundary pixels, but undetermined. A potential map can be computed using the label.

In some embodiments, the potential map can be computed by applying a random walks algorithm to scale space images. The resulting potential map is used to identify an object boundary. The potential map can be used with the random walks algorithm to improve object boundary identification in the presence of noise.

These illustrative examples are given to introduce the reader to the general subject matter discussed here and are not intended to limit the scope of the disclosed concepts. The following sections describe various additional embodiments and examples with reference to the drawings in which like numerals indicate like elements.

Illustrative System Implementation

FIG. 1 depicts a system that is capable of determining a potential map using scale space images generated from the image and of allowing the potential map to be used to process the image according to certain embodiments. Other embodiments may be utilized. The system includes a computing device 102 having a processor 104 that can execute code stored on a computer-readable medium, such as a memory 106, to cause the computing device 102 to determine the potential map using scale space images generated from the image. The computing device 102 may be any device that can process data and execute code that is a set of instructions to perform actions. Examples of the computing device 102 include a desktop personal computer, a laptop personal computer, a server device, a handheld computing device, and a mobile device.

Examples of the processor 104 include a microprocessor, an application-specific integrated circuit (ASIC), a state machine, or other suitable processor. The processor 104 may include one processor or any number of processors. In some embodiments, the processor 104 includes a Graphics Processing Unit (GPU) associated with a high-end graphics card with 1 GB or less of VRAM. In other embodiments, the processor 104 is a multi-core processors that include two, four, or more processing units. The multi-core processors may include single-instruction, multiple-data (SIMD) compatibilities, such as Streaming SIMD Extensions (SSE) and 3DNow!. Linear algebra packages, such as LAPACK, can be used to use capabilities of SIMD extensions and processors advantageously.

The processor 104 can access code stored in the memory 106 via a bus 108. The memory 106 may be any tangible computer-readable medium capable of storing code. The memory 106 can include electronic, magnetic, or optical devices, capable of providing processor 104 with executable code. Examples of the memory 106 include random access memory (RAM), read-only memory (ROM), a floppy disk, compact disc, digital video device, magnetic disk, an ASIC, a configured processor, or other storage device capable of tangibly embodying code. The bus 108 may be any device capable of transferring data between components of the computing device 102. The bus 108 can include one device or multiple devices.

The computing device 102 can share data with additional components through an input/output (I/O) interface 110. The I/O interface 110 can include a USB port, an Ethernet port, a serial bus interface, a parallel bus interface, a wireless connection interface, or any suitable interface capable of allowing data transfers between the computing device and another component. The additional components can include a user interface (UI) device 112, a display 114, and a network 116. The UI device 112 can include a keyboard, a mouse device, a touch screen interface, or other device capable of receiving commands from a user and providing the commands to the computing device 102. The display 114 can include a liquid crystal display (LCD), a plasma screen, cathode ray tube (CRT), or any device capable of displaying images generated by the computing device 102. The network 116 can include the internet, an intranet, wide area network (WAN), local area network (LAN), virtual private network (VPN), or any suitable communications network that allows computing device 102 to communicate with other components. In other embodiments, the computing device 102 is an offline device capable of performing various methods according to various embodiments of the present invention in an offline manner.

Instructions can be stored in the memory 106 as executable code. The instructions can include processor-specific instructions generated by a compiler and/or an interpreter from code written in any suitable computer-programming language, such as C, C++, C#, Visual Basic, Java, Python, Perl, JavaScript, and ActionScript. The instructions can include a image processing application 118 that, when executed by the processor 104, can cause the computing device 102 to determine a potential map using scale space images generated from the image and to use the potential map to process the image. The image processing application 118 includes a scale space engine 120 that, when executed with the image processing application 118 by the processor 104 can cause the computing device 102 to generate scale space images from the image to determine the potential map from the scale space images, and to use the potential map to process the image.

This exemplary system configuration is provided merely to illustrate a potential configuration that can be used to implement certain embodiments. Other configurations may of course be utilized.

Exemplary Methods of Generating a Potential Map

Figure 2:
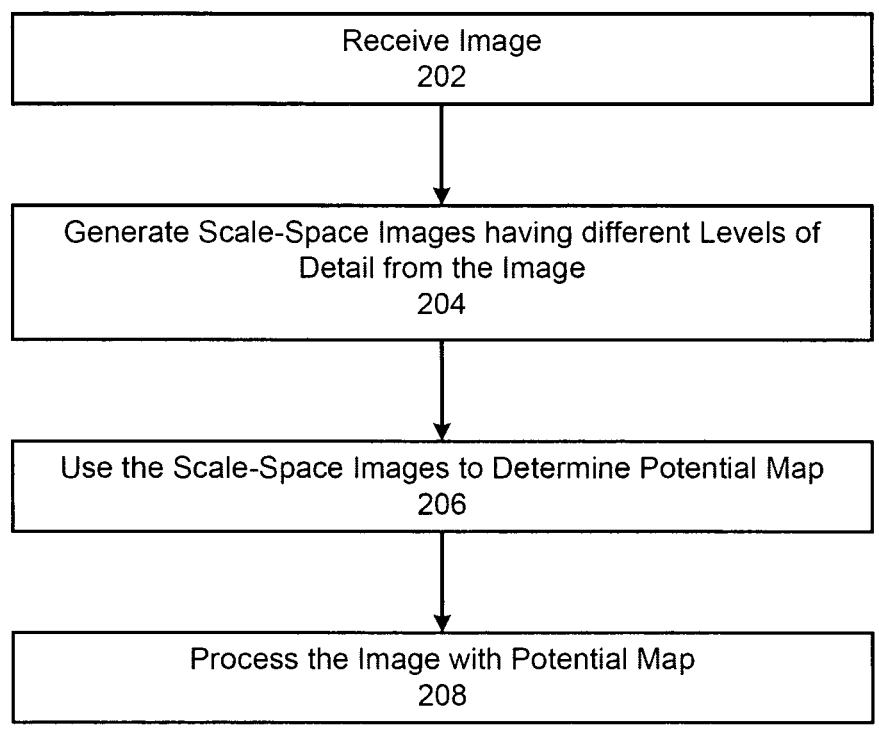
FIG. 2 is a flow diagram of a method for generating a potential map with which to process an image according to one embodiment of the present invention.

Potential maps used to process images can be generated using a variety of methods according to various embodiments of the present invention. FIG. 2 illustrates one embodiment of method for generating a potential map from scale space images. The method illustrated in FIG. 2 is described with reference to the system configuration of FIG. 1. However, other system implementations are possible.

In block 202, the image processing application 118 receives an image. The image may be, for example, an image of a motion picture that is a sequence of images. In some embodiments, the image includes one or more objects. Objects may be tangible items that are visually represented in the image. The image may be an RGB (red, green, blue,) image or in a different color space, such as YUV, XYX, or CIE L*a*b* color space.

In block 204, the scale space engine 120 generates scale space images having different levels of detail from the image. Each scale space image can have a different level of detail as compared to the other scale space images generated. The scale space engine 120 can generate scale space images using a variety of methods. One method includes using filters with different kernel sizes to filter the image. Each filter can produce a scale space image that has a certain level of detail that is different than other scale space images produced by different sized filters. The filters may be implemented as software, for example as part of the scale space engine 120. In other embodiments, the filters are implemented in hardware that the scale space engine 120 accesses or controls.

In some embodiments, the scale space images may be generated after the scale space engine 120 converts the image to scale space. An image can be converted to scale space using, for example, wavelet filters or an edge persevering decomposition process.

In block 206, the scale space engine 120 uses the scale space images to determine a potential map for the image. A potential map can include potential values associated with the pixels or part of the pixels of the image. For example, a potential value can be associated with a pixel of the image. The potential value can represent a likelihood of the associated pixel being within a boundary of an object in the image or being outside the boundary of the object. In some embodiments, a potential value is determined for a pixel based on weights that are associated with links between the pixel and neighboring pixels. The links and associated weights can be identified and can be determined using the scale space images.

In block 208, the image processing application 118 processes the image using the potential map. For example, the image processing application can generate an image mask for the image using the potential map. The image mask can be used to identify objects in the image. In some embodiments, the object location in the image can be modified after using the potential map to identify the object boundary.

Figure 3:
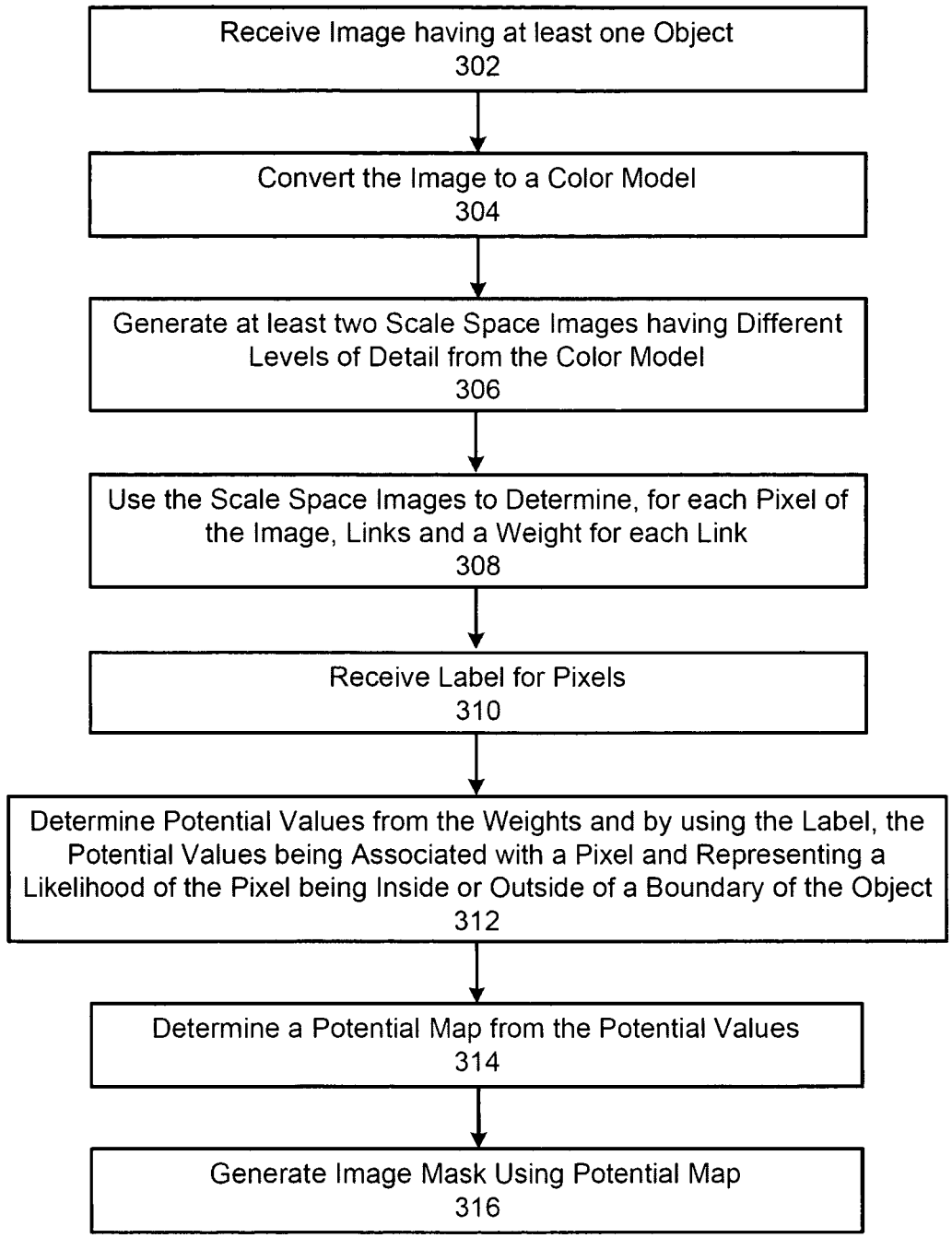
FIG. 3 is a flow diagram of method for generating a potential map with which to process an image according to a second embodiment of the present invention.

FIG. 3 depicts another embodiment of a method for generating potential maps for use in processing images. The method of FIG. 3 is described with reference to the system of FIG. 1 and graphical illustration of FIG. 4. However, other implementations are possible.

In block 302, the image processing application 118 receives an image that includes at least one object. The image processing application 118 can receive the image as in block 202 of FIG. 2.

In block 304, the scale space engine 120 converts the image to a color model. Converting to a color model may allow the scale space engine 120 to discriminate between colors of the image more easily. In some embodiments, the image is an RGB image that is converted to a color model that is the image in a CIE L*a*b* color space.

In block 306, the scale space engine 120 generates at least two scale space images from the color model. The scale space images can have different levels of detail. Each scale space image has a level of detail that is different from the other scale space images. Scale space images can be performed using a variety of methods. In one embodiment, Gaussian low-pass filter (LPF) kernels of progressively larger sizes are used to filter the image to generate scale space images. Using Gaussian kernels may help prevent undesirable structures from being introduced into the image, particularly for filters of relatively large size. The scale space images generated by the Gaussian kernels may have different levels of detail that include different amounts of image blur.

Scale space, $\zeta$, with N-levels can be represented as:

$$\zeta = \{I[x,y] * f(x,y|\sigma_n) : \sigma_n = 0,1,2,4,\ldots,2^{N-1}\}$$

where,
I[x,y] is an initial image; and $$f(x, y | \sigma_n) = \frac{1}{\sqrt{2\pi\sigma_n^2}} \exp\left\{\frac{-(x^2 + y^2)}{2\sigma_n^2}\right\},$$

which is a Gaussian kernel of size n.

From the N scale space images in the scale space, $\zeta$, the scale space engine 120 can generate a three-dimensional graph for each pixel of an image or a portion of the image. The graph can illustrate the relationship between pixels of different levels of the scale space images and can illustrate the relationship between a pixel of a certain level and a neighboring pixel.

Figure 4:
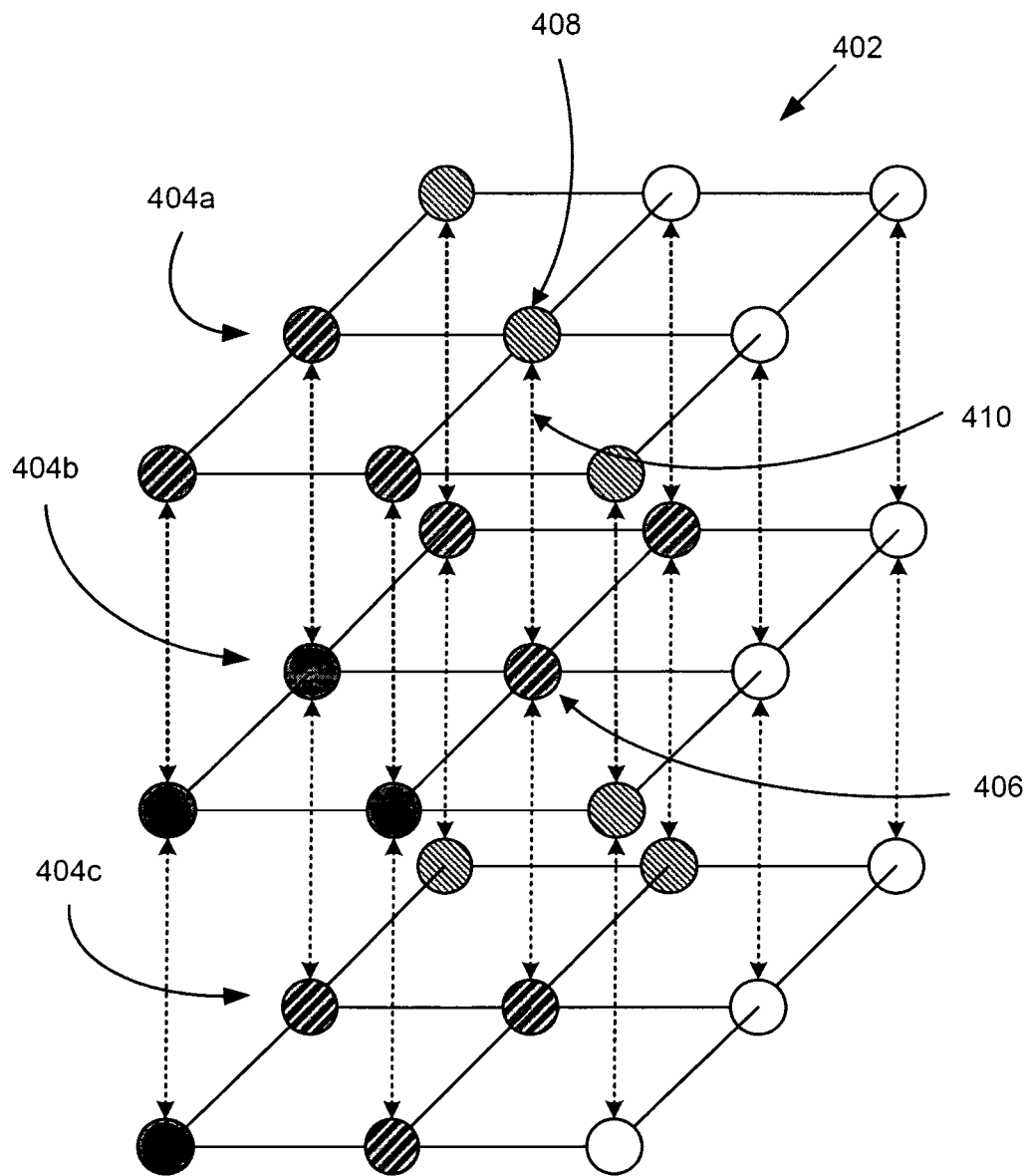
FIG. 4 is an illustration of a graph for a pixel of an image based on scale space images according to one embodiment of the present invention.

FIG. 4 illustrates a graph 402 generated from scale space, $\zeta$, according to one embodiment of the present invention. The graph includes different layers 404a-c. Although three layers 404a-c are shown, any number of layers can be implemented. Each layer of layers 404a-c may correspond to a scale space image generated from the image. Each node in a layer can correspond to a pixel in a corresponding scale space image. For example, layer 404a can correspond to a first scale space image, layer 404b can correspond to a second scale space image, and layer 404c can correspond to a third scale space image.

Furthermore, the layers 404a-c can be arranged from a greater level of detail to a least level of detail. For example, layer 404a can correspond to the first scale space image that has the greatest level of detail, such as a fine level of detail, among the first scale space image, a second scale space image, and a third scale space image. Layer 404b can correspond to the second scale space image that has a medium level of detail among the first scale space image, the second scale space image, and the third scale space image. Layer 404c can correspond to the third scale space image that has the lowest level of detail, which can be referred to as the course level, among the first scale space image, the second scale space image, and the third scale space image.

The graph 402 in FIG. 4 is a six-connected structure that includes pixels 406. Other types of connected structures, such as eight-connected structures, or otherwise, can be implemented. Each pixel of pixels 406 corresponds to a scale space image and can be connected to six corresponding pixels, such as four neighboring pixels in the same layer and corresponding pixels from a higher layer and a lower layer. Each pair of connected pixels can have a link between the connected pixels. Link 410, for example, is located between pixel 408 on layer 404a and pixel 406 on layer 404b. This arrangement can allow each layer to influence other layers such that detail can be retained at higher layers and effects from noise can be controlled at lower layers.

In block 308, the scale space engine 120 uses the scale space images to determine, for each pixel of the image, links and weight for each link. For example, each link in FIG. 4 represents the connection between a pixel and a neighboring pixel, or a corresponding pixel in another layer of a potential map, and the links may be associated with weights. A weight for a link can be determined using the following relationship:

$$G_{i,j} = \frac{2}{1 + \exp(\beta \|\vec{c}_i - \vec{c}_j\|)}$$

where,
$G_{i,j}$ is a weight for a link between pixel i and j;
$\vec{c}_i$ is a color vector representing pixel i;
$\vec{c}_j$ is a color vector representing pixel j, which is adjacent to pixel i; and
β is a free parameter that, in some embodiments, is set to a value of ninety.

In block 310, the scale space engine 120 receives a label for pixels. A label may represent an estimation of a boundary of an object for an image. In some embodiments, a label is received through a user interface from an individual that is inputting commands via an input device to identify an estimation of a boundary for an object. In other embodiments, a label is received by the scale space engine 120 when the scale space engine 120 generates the label as discussed below, for example, with reference to FIGS. 5 and 6. The label may be used by the scale space engine 120 to identify pixels that potentially may be a boundary of an object. For example, the undetermined pixels may be identified by the label and then further processed to determine further the pixels that are associated with the boundary of the object.

In block 312, the scale space engine 120 determines potential values from the weights and by using the label. The potential values can be associated with a pixel and can represent a likelihood of the pixel being inside or outside of a boundary of the object. In some embodiments, the label is used to identify the pixels for which a potential value is to be determined. The potential value for a pixel may be determined using the following relationship:

$$L\vec{v} = \vec{b}$$

where,
$\vec{v}$ is a vector potential value to be determined;
$\vec{b}$ is a boundary vector that defines the boundary conditions of the system; and
L is a Laplacian matrix in which each element is determined by the weights in a graph.

The Laplacian matrix, L, can be determined using weights, $G_{i,j}$, of a graph, such as the graph of FIG. 4, using the following relationship:

$$L_{i,j} = \begin{cases} \sum_{k=1}^{n} G_{i,k}, & i = j, \\ -G_{i,j}, & i \neq j, \quad \text{where node } i \text{ is adjacent to node } j, \\ 0, & \text{elsewhere.} \end{cases}$$

The weights, $G_{i,j}$, can be determined as described with reference to FIG. 4.

The Laplacian matrix, L, can be decomposed to the following form:

$$L = \begin{bmatrix} L^u & 0 & 0 \\ 0 & L^b & 0 \\ 0 & 0 & I \end{bmatrix}$$

where,
$L^u$ is a sub-matrix of a Laplacian matrix that includes rows and columns associated with undetermined pixels;
$L^b$ is a sub-matrix that includes the boundary pixels, but not the undetermined pixels;
I is the identity matrix representing pixels that are assigned as a source or sink pixels that may not affect a solution; and
0 is a "zero matrix," a matrix that includes zeros only.

Potential values can therefore be determined using the following relationship:

$$\vec{v} = (L^u)^{-1}\vec{b}$$

The potential values can form a potential map. The potential values for a pixel (x,y) can be denoted by P(x,y).

The result of solving for the potential values based on an N level scale space images can be a new scale space, Π, represented by the following:

$$\Pi = (P(x,y|n) : n = 0, 1, 2, 3, \ldots, (N-1))$$

where,
n is an index for a particular level in an N level scale space; and
P(x,y|n) is a potential map for the nth level.

In block 314, the scale space engine 120 determines a potential map from the potential values. The potential values can be represented by the N level scale space, Π.

In some embodiments, a final potential map, P(x,y), is determined by performing a geometric mean on each level of the scale space, as represented by the following relationship:

$$P(x, y) = \left(\prod_{i=0}^{N-1} P(x, y \mid i)\right)^{1/N}$$

In some embodiments, an arithmetic mean may be used instead of a geometric mean. However, the geometric mean can be more effective than an arithmetic mean result in the result being incorrect as compared to an actual tendency. In some embodiments, the result details at finer scale space images are retained, and areas that are fuzzy in the course scale space images are removed.

Furthermore, a geometric mean can result in a potential map that removes dependency between different levels established through layer-to-layer linkages in scale space.

In some embodiments, the potential map is locally smooth. For example, regions that are the same or similar have an overall gradient that does not change abruptly. Strong edges include abrupt gradient changes that can assist in identifying such strong edges. Furthermore, the potential map can eliminate small variations (i.e. noise) in the image at higher levels in the scale space.

In block 316, the image processing application 118 uses the potential map to generate an image mask for the image. An image mask may be a representation of an image that can be used to identify image object boundaries. The potential map can be used, for example, to identify boundary pixels of an object. An image mask can be generated using the identified object boundary pixels. In some embodiments, the scale space engine 120 may use a threshold to determine a digital value for each pixel. For example, if the potential value, P(x,y), is greater than or equal to 0.5, a digital "one" can be assigned to the pixel. If the potential value, P(x,y), is less than 0.5, a digital "zero" can be assigned to the pixel. The threshold of 0.5 represents an equal likelihood that a pixel is a foreground pixel or is a background pixel. Any pixel with a probability that is greater than 0.5 can therefore be considered a foreground pixel, represented by a digital "one." Any pixel with a probability that is less than 0.5 can therefore be considered a background pixel, represented by a digital "zero."

Exemplary Methods of Generating a Label

Figure 5:
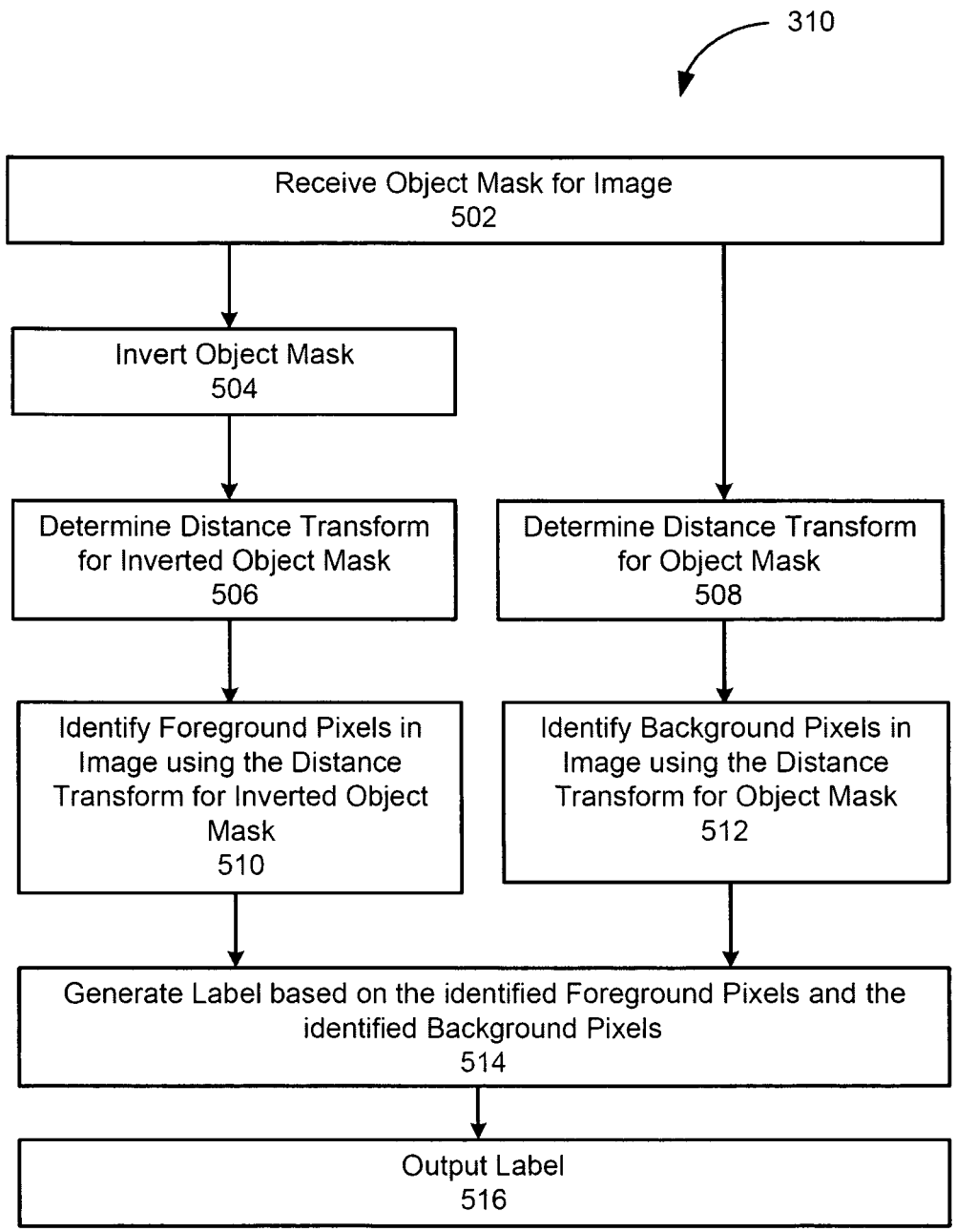
FIG. 5 is a flow diagram of a method for determining a label from an image based on an object mask according to one embodiment of the present invention.
Figure 6:
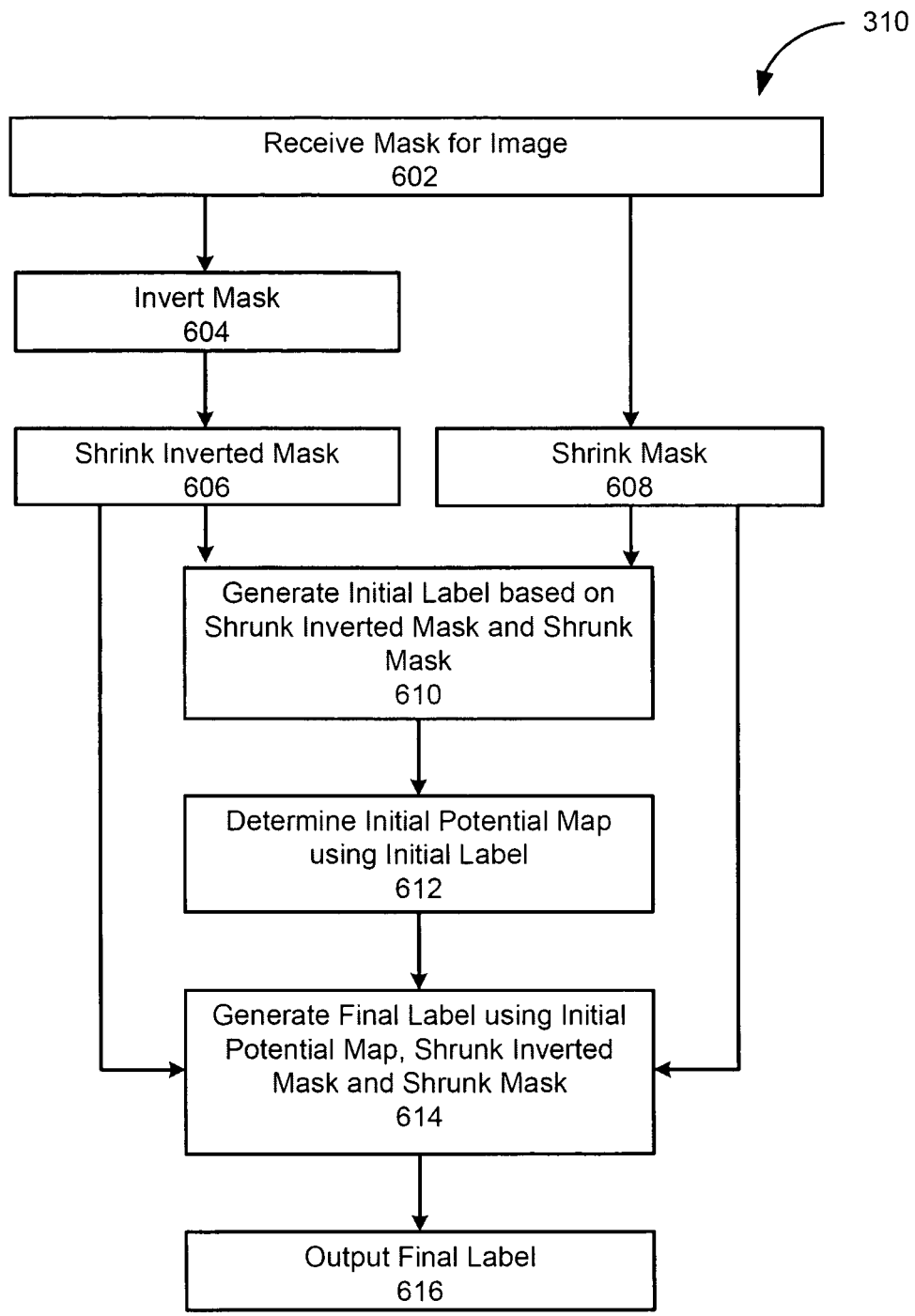
FIG. 6 is a flow diagram of a method for determining a label from an image based on an object mask according to a second embodiment of the present invention.

Labels according to some embodiments of the present invention can be generated from the image. For example, the scale space engine 120 can receive an object mask for the image and use the object mask to determine a label. An object mask can be a rough estimate of an object by estimating pixels that are associated with the boundary of an object, which can include imprecise pixel designations as boundary pixels. An object mask can be received by the scale space engine 120. FIGS. 5 and 6 illustrate embodiments of methods for receiving a label in block 310 by generating the label. The embodiments for generating a label are described with reference to the system of FIG. 1. Other system implementations, however, are possible.

Furthermore, the embodiment depicted in FIG. 5 is described with reference to the illustrations in FIGS. 7A-7D.

Figure 7A:
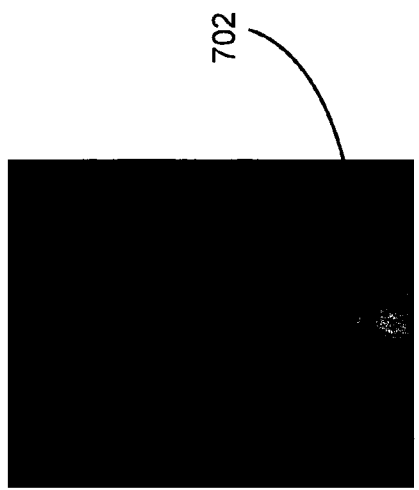
FIGS. 7A-7D are illustrations of determining a boundary of an object in an image according to one embodiment of the present invention.

In block 502, the scale space engine 120 receives an object mask for an image. In some embodiments, the object mask can identify a portion of the image that is larger than the object of interest. Furthermore, an object mask can delineate more than one object, which may require the object of interest to be separated before further processing. FIG. 7A depicts an example of an object mask for object 702. The object 702 shown is a pear in an image that has foreground pixels represented using white color and background pixels represented using black color.

In block 504, the scale space engine 120 inverts the object mask to generate an inverted object mask. In an inverted object mask, background pixels become foreground pixels and vice versa. The object mask can be inverted by changing values of high-value pixels to low and vice versa. For example, an inverted object mask of the object mask in FIG. 7A may include pixels that make up the object being designated by the color black and all other pixels being designated by the color white.

Figure 7B:
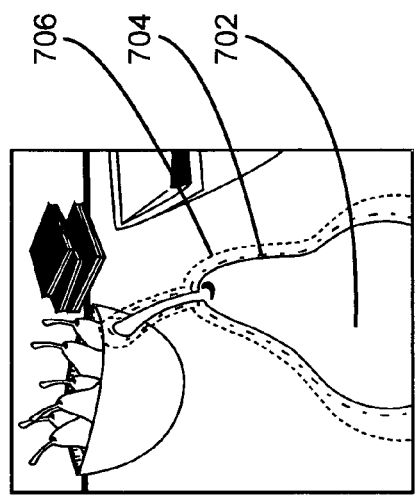

In block 506, the scale space engine 120 determines a distance transform for the inverted object mask. A distance transform may be a representation that indicates, for each background pixel, the distance to the nearest boundary pixel. FIG. 7B depict an example of a distance transform for the inverted object mask of the object 702. In FIG. 7B, the pixels that represent the object 702 are background pixels, and the background pixels that are closest to a boundary pixel are darker than those background pixels that are further away.

In block 508, the scale space engine 120 determines a distance transform for the object mask. A distance transform for the object mask may appear as the opposite as the image in FIG. 7B. The pixels that represent the object 702 become foreground pixels. The pixels in the background that are closest to a boundary pixel may be darker than those pixels that are further away.

In block 510, the scale space engine 120 identifies foreground pixels in the image using the distance transform for the inverted object mask. In some embodiments, the value of the distance transform for a pixel of the inverted object mask is compared to the first value that is a boundary tolerance. If the value of the distance transform for the pixel is greater than the first value that is a boundary tolerance, the pixel can be identified as a foreground pixel. The process can be repeated for each pixel to identify the foreground pixels.

In block 512, the scale space engine 120 identifies background pixels in the image using the distance transform for the object mask. The value of the distance transform for a pixel of the object mask can be compared to the second value that is a boundary tolerance. If the value of the distance transform for the pixel is greater than the second value that is a boundary tolerance, the pixel can be identified as a background pixel. The process can be repeated for each pixel to identify the background pixels.

Figure 7C:
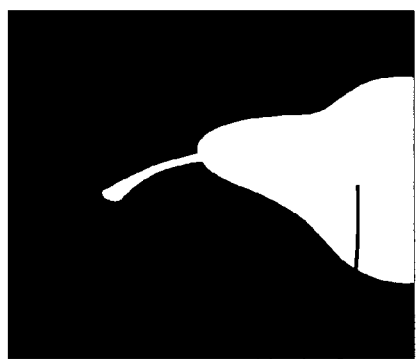

In block 514, the scale space engine 120 generates a label that is based on the identification of the foreground pixels and the background pixels. The foreground pixels identified in block 510 can form a subset of the foreground pixels shown in FIG. 7A, for example. Similarly, background pixels identified in block 512 can form a subset of the background pixels shown in FIG. 7A, for example. Undetermined pixels—pixels that are not identified as foreground pixels or background pixels—form an unknown region. The scale space engine 120 can identify and store the unknown region as a label for the object 702. FIG. 7C depicts an example of a label (depicted in black color) for object 702.

The first value and the second value, which are boundary tolerances, can be selected such that the label is sufficiently large to include the actual boundary of the object 702. In some embodiments, the first value and the second value are uniform across the boundary of the object. In other embodiments, one or both of the first value and the second value are not uniform across the boundary of the object. For example, varying one or both of the first value and the second value can result in a label with a varying width.

Figure 7D:
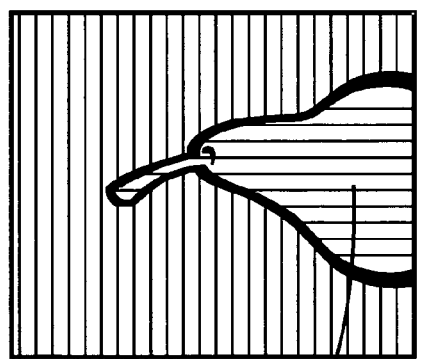

In block 516, the scale space engine 120 outputs the label. A label can define an unknown region around the boundary of the object that is of interest. A label can be used to determine a potential map for underdetermined pixels as described, for example, above with reference to FIG. 3. In some embodiments, an object mask can be produced based on the potential map and the object mask can be more accurate than an original mask. In some embodiments, the label is provided with the image as band covering the boundary of the object of interest. FIG. 7D depicts the object 702 with a boundary 704 of a new object mask that is outputted as a comparison with the boundary 706 of the original mask. The boundary 704 of the new object mask more closely identifies an actual boundary of the object 702 as compared to the boundary 706 of the original mask.

In some embodiments, a more precise label can be generated from an initial label that is computed from an object mask. FIG. 6 depicts one embodiment of generating a label.

In block 602, the scale space engine 120 receives an object mask for an image. The object mask may be a representation of an image that represents pixels of an object (foreground pixels) with a first color and pixels outside the object (background pixels) with a second color.

In block 604, the scale space engine 120 inverts the object mask. For example, the foreground pixels can be inverted to background pixels and designated with a second color. The background pixels can be inverted to foreground pixels with a first color.

In block 606, the scale space engine 120 shrinks the inverted object mask. Shrinking the inverted object mask can include morphologically thinning the inverted object mask to determine hard background constraints, which may include a partial skeletonization of the background. The hard background constraints may prevent fine details in the mask from disappearing during further processing. In some embodiments, the hard background constraints are used as background pixels.

In block 608, the scale space engine 120 shrinks the object mask. In some embodiments, the object mask is shrunk by morphological thinning the object mask to determine hard foreground constraints, which may include a partial skeletonization of the object mask. The hard foreground constraints may prevent fine details in the mask from disappearing during further processing. The hard foreground constraints can be used as foreground pixels.

In some embodiments, the object mask is padded by twice the tolerance before thinning, thinned by twice the tolerance, and then unpadded by twice the tolerance to avoid edge effects and to support constraints being computed for the unknown region. Constraints within the tolerance of the object mask boundary may be kept.

In block 610, the scale space engine 120 generates an initial label based on the shrunk inverted mask, and the shrunk mask. The shrunk inverted mask may be represented by hard background constraints. The shrunk mask may be represented by hard foreground constraints. The initial label may represent an estimation of the unknown region of the image from the outline of the object mask and the hard constraints. In some embodiments, certain foreground pixels are determined from a combination of the hard constraints obtained from morphological thinning and a portion of the boundary of the mask. This portion may be located at least ⅛ of the tolerance away from the foreground constraints obtained through the morphological thinning. The background pixels may be identified as those located greater than the tolerance away from the boundary of the mask, in addition to the hard background constraints determined through morphological thinning.

In block 612, the scale space engine 120 determines an initial potential map using the initial label. For example, the initial potential map may be determined in the same or similar manner as described above with reference to blocks 312 and 314 of FIG. 3 by using the initial label.

In block 614, the scale space engine 120 generates a final label using the initial potential map, the shrunk inverted mask, and the shrunk mask. The shrunk inverted mask and the shrunk mask may be represented by the hard foreground constraints and the hard background constraints.

In block 616, the scale space engine 120 outputs the final label. The final label may be outputted overlaying the image or otherwise. In some embodiments, scale space engine 120 receives the final label by outputting it and can use the final label for further processing as discussed with reference to FIG. 3.

Exemplary Methods of Processing an Image Using a Potential Map

Potential maps according to various embodiments of the present invention can be used to improve processing of the images to produce desired quality and processing efficiency. In some embodiments, potential maps can be used to process images in methods that require user interfaces for a skilled user. For example, a method may be an interactive method that uses potential maps with inputs received from a user to process images.

Figure 8:
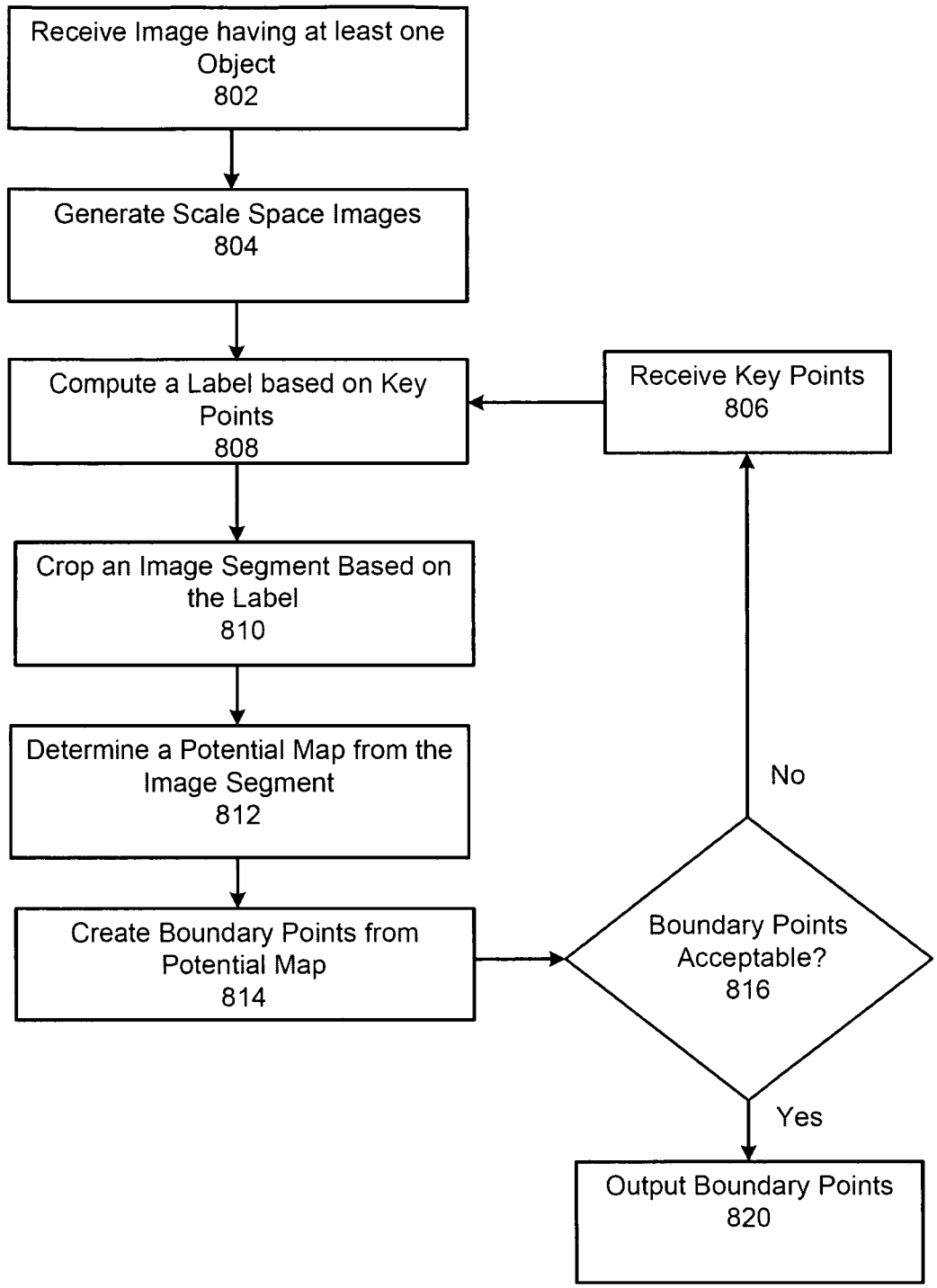
FIG. 8 is a flow diagram of a method for determining object boundary points based on key points using a potential map according to one embodiment of the present invention.

FIG. 8 depicts one embodiment a method for processing images using a potential map and user inputs. The method of FIG. 8 is described with reference to the system depicted in FIG. 1. Other implementations, however, are possible.

In block 802, the scale space engine 120 receives an image that has at least one object. The object may be a representation of an actual object. The image can include background objects that are different from the object. For example, the object may be an "object-of-interest" and the background objects may be considered the same as other background pixels not associated with an object.

In block 804, the scale space engine 120 generates scale space images from the image. Scale space images can be generated, for example, using the methods described with reference to FIG. 2 or FIG. 3.

In block 806, the scale space engine 120 receives key points. Key points may be points on a boundary of an object that are received from a user through the UI device 112. For example, the image with the label overlayed on it can be displayed to the user on the display 114. A user can use a mouse or other device to identify two or more key points located on a boundary of the object. The key points can be spaced apart by a certain amount. The key points may be used to refine the label, for example, or otherwise. The scale space engine 120 may also received an indication from a user of the region associated with inside the boundary and the region associated with outside the boundary.

In block 808, the scale space engine 120 computes a label based on the key points. A label can be computed by estimating a line segment or a spline segment connecting the key points. In one embodiment, a line segment or a spline segment is estimated by interpolation between the key points. A boundary tolerance value can be assigned to the segment to produce a label that is extended along the segment and that has a width equivalent to the boundary tolerance value. The region covered by the label can be determined by the value for the boundary tolerance selected to ensure true boundary pixels are included in the resulting label. If the selected tolerance value exceeds the distance between the key points, the tolerance value can be reduced proportionally. The scale space engine 120 can also determine the side of the label that is associated with foreground pixels (inside the object) and the side of the label that is associated with the background pixels (outside the object).

In block 810, the scale space engine 120 crops an image segment from the image based on the label. For example, the scale space engine 120 can isolate the image segment from the image to analyze further.

In block 812, the scale space engine 120 determines a potential map. The potential map can be determined from the image segment. For example, the potential map can be determined using a method as described with reference to FIG. 2 or FIG. 3.

In block 814, the scale space engine 120 computes boundary points associated with the boundary of the object from the potential map. In some embodiments, the potential map is used to identify pixels between the key points that are likely to be the boundary of the object. The pixels may be identified using the key points and the potential map that identifies the likelihood of the pixels between the key points being associated with the boundary of an object.

The scale space engine 120 can receive an indication of whether the boundary points are acceptable in block 816. The boundary points may be acceptable if the boundary points appear to the user to be associated with the boundary of the object. The points may be unacceptable if one or more of the points do not appear to the user to be associated with the boundary of the object.

If the scale space engine 120 receives an indication that the points are not acceptable, the process returns to block 806, in which the scale space engine 120 receives additional key points. The additional key points may be points on a boundary of an object that are identified from a user through the UI device 112. For example, the image with the label overlaid on it can be displayed to the user on the display 114. A user can use a mouse or other UI device 112 to identify additional key points located on a boundary of the object. The additional key points can be received in block 806, and a more accurate label computed based on these additional key points in block 808. This process can be repeated until the boundary points are found accepted in block 816. If the scale space engine 120 receives an indication that the boundary points are acceptable, the scale space engine 120 outputs the boundary points in block 820 for further processing. In some embodiments, the boundary points can be outputted to the display 114 by overlaying the boundary points on the image.

Further processing can include various processes. For example, the boundary points can be used to generate an object mask for the image segment between the key points. A complete object mask can be generated by repeating the process as described in FIG. 8 for all key point pairs.

Examples of other image processing methods that may use potential maps include (a) semiautomatic improvement of an existing object boundary and (b) improvement of boundaries in interpolated frames.

In a semiautomatic improvement method, a boundary for an object has been determined and is associated with control points. The control points can be treated as "key points" and the method described with reference to FIG. 8 can be used to generate pixel-accurate boundaries between the control points. Crop boxes can be generated for each segment or spline of the boundary, and labeling of each segment or spline can be set to be associated with the control points. Each crop box can be processed independent of the others. In some embodiments, the scale space transform is applied to all of the crop boxes together. The process can result in a replacement object boundary. A user can choose between the original object boundary and the replacement object boundary.

In an improvement of boundaries in interpolated frames method, interpolated points can be moved. In the interpolated frame, unknown regions for each segment of an object boundary can be extended to overlap by a certain tolerance around an interpolated point. The intersection of the unknown regions can be considered the unknown region for applying the method of FIG. 8, for example. The foreground and background pixels can be determine from the intersection of boundaries of segment boundaries. After applying the method of FIG. 8, for example, the interpolated point can be moved to a point that is closest to an original position on the estimated boundary, which may be overridden or modified by a user as needed.

General

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

The invention claimed is:

1. A method comprising:
receiving an image having at least one object;
generating, by a computing device, at least two scale space images from the image, the computing device comprising a processor configured to cause the computing device to create the at least two scale space images, the at least two scale space images having different levels of detail and being the same size;
using the at least two scale space images to determine, for each pixel of the image, a three-dimensional graph with a plurality of links to adjacent pixels to that pixel;
determining a plurality of weights for the plurality of links of the three-dimensional graph;
determining potential values from the plurality of weights, each potential value representing a likelihood of an associated pixel being within a boundary of the object or being outside the boundary of the object;
determining a potential map from the potential values; and
using the potential map to process the image.

2. The method of claim 1, further comprising converting the image to a color model, wherein the color model comprises the image in a CIE L*a*b* color space.

3. The method of claim 1, wherein generating the at least two scale space images from the image comprises converting the image to scale space using at least two low-pass filters.

4. The method of claim 3, wherein the at least two low-pass filters comprise Gaussian kernels, wherein the different levels of detail comprises different degrees of blur.

5. The method of claim 1, wherein generating the at least two scale space images from the image comprises converting the image to scale space using at least two wavelet filters.

6. The method of claim 1, wherein generating the at least two scale space images from the image comprises converting the image to scale space using an edge persevering decomposition process.

7. The method of claim 1, wherein determining the plurality of weights for the plurality of links of the three-dimensional graph comprises:
- determining the plurality of links associated with a pixel;
- determining a weight for each link of the plurality of links associated with the pixel; and
- collecting the weight for each link of the plurality of links to form the plurality of weights.

8. The method of claim 1, wherein determining the potential map from the potential values comprises determining a geometric mean for the potential values, the potential map comprising the geometric mean for the potential values.

9. The method of claim 1, further comprising receiving a label for the at least one object, the label including boundary pixels of the at least one object, wherein determining potential values from the plurality of weights comprises determining the potential values using the label.

10. The method of claim 9, wherein receiving the label comprises generating the label comprising:
- receiving an object mask for the image;
- computing an inverted object mask from the object mask for the image;
- determining a first distance transform from the inverted object mask;
- determining a second distance transform from the object mask;
- identifying foreground pixels in the image using the first distance transform;
- identifying background pixels in the image using the second distance transform; and
- generating the label based on the identified foreground pixels and the identified background pixels.

11. The method of claim 9, wherein receiving the label comprises generating the label comprising:
- receiving an object mask for the image;
- computing an inverted object mask from the object mask for the image;
- shrinking the inverted object mask;
- shrinking the object mask for the image;
- generating an initial label based on the shrunk inverted object mask and based on the shrunk object mask for the image;
- determining an initial potential map for the image using the initial label; and
- generating the label using the initial potential map, the shrunk inverted object mask, and the shrunk object mask.

12. The method of claim 11, wherein shrinking the inverted object mask comprises using a morphological thinning process on the inverted object mask, wherein shrinking the object mask for the image comprises using the morphological thinning process on the object mask for the image.

13. The method of claim 1, wherein using the potential map to process the image comprises using the potential map to generate an image mask.

14. The method of claim 13, wherein using the potential map to generate the image mask comprises:
- receiving at least two key points identifying an estimated boundary of the object;
- computing a label based on the at least two key points;
- cropping an image segment based on the label;
- determining a potential map from the image segment;
- creating boundary points from the potential map;
- responsive to receiving a command identifying the boundary points as being unacceptable, computing a second potential map using new key points;
- responsive to receiving a command identifying the boundary points as being acceptable, outputting the boundary points; and
- generating the image mask using the boundary points.

15. The method of claim 14, wherein the new key points comprises a greater number than the at least two key points.

16. The method of claim 14, wherein the at least two key points identify the estimated boundary of the object in at least two image frames, wherein the boundary points identify the portion of the estimated boundary of the object in at least one image frame located between the at least two image frames.

17. A computing device comprising:
- a processor; and
- a computer-readable medium for storing a scale space engine, the scale space engine being executable by the processor to cause the computing device to:
  - receive an image having at least one object;
  - generate at least two scale space images from the image, the at least two scale space images having different levels of detail and being the same size;
  - use the at least two scale space images to determine, for each pixel of the image, a plurality of weights, each weight of the plurality of weights being associated with a link;
  - receive a label for the at least one object, the label including boundary pixels of the at least one object;
  - determine potential values from the plurality of weights and using the label, each potential value representing a likelihood of an associated pixel being within a boundary of the object or being outside the boundary of the object;
  - determine a potential map from the potential values; and
  - use the potential map to create an image mask for processing the image.

18. The computing device of claim 17, wherein the scale space engine is configured to cause the computing device to convert the image to a color model, wherein the color model comprises the image in a CIE L*a*b* color space.

19. The computing device of claim 17, wherein the scale space engine is configured to cause the computing device to generate the at least two scale space images from the image by converting the image to scale space using one of (i) at least two wavelet filters, (ii) an edge persevering decomposition process, or (iii) at least two low-pass filters.

20. The computing device of claim 17, wherein the scale space engine is configured to cause the computing device to determine the potential map from the potential values by determining a geometric mean for the potential values, the potential map comprising the geometric mean for the potential values.

21. The computing device of claim 17, wherein the scale space engine is configured to cause the computing device to receive the label for the image by generating the label, wherein the scale space engine is configured to cause the computing device to generate the label by:
- receiving an object mask for the image;
- computing an inverted object mask from the object mask for the image;
- determining a first distance transform from the inverted object mask;
- determining a second distance transform from the object mask;
- identifying foreground pixels in the image using the first distance transform;

identifying background pixels in the image using the second distance transform; and generating the label based on the identified foreground pixels and the identified background pixels.

22. The computing device of claim 17, wherein the scale space engine is configured to cause the computing device to receive the label for the image by generating the label, wherein the scale space engine is configured to cause the computing device to generate the label by:

receiving an object mask for the image;

computing an inverted object mask from the object mask for the image;

shrinking the inverted object mask; shrinking the object mask for the image;

generating an initial label based on the shrunk inverted object mask and based on the shrunk object mask for the image;

determining an initial potential map for the image using the initial label; and generating the label using the initial potential map, the shrunk inverted object mask, and the shrunk object mask.

23. A non-transitory computer-readable medium having program code stored on the computer-readable medium, the program code comprising:

code for receiving an image having at least one object;

code for generating at least two scale space images from the image by converting the image to scale space using one of (i) at least two wavelet filters or (ii) an edge preserving decomposition process, the at least two scale space images having different levels of detail;

code for using the at least two scale space images to determine a potential map, the potential map representing a likelihood of whether a pixel is within a boundary of the object or outside the boundary of the object; and code for using the potential map to identify the boundary of the object.

24. The computer-readable medium of claim 23, further comprising code for converting the image to a color model, wherein the color model comprises the image in a CIE L*a*b* color space.

25. The computer-readable medium of claim 23, wherein code for using the at least two scale space images to determine the potential map comprises:

code for using the at least two scale space images to determine, for each pixel of the image, a plurality of weights, each weight of the plurality of weights being associated with a link, comprising:

code for determining a plurality of links associated with a pixel;

code for determining a weight for each link of the plurality of links associated with the pixel; and code for collecting the weight for each link of the plurality of links to form the plurality of weights;

code for receiving a label for the image:

code for determining potential values from the plurality of weights and using the label, each potential value representing a likelihood of an associated pixel being within a boundary of the object or being outside the boundary of the object; and code for determining the potential map from the potential values, comprising code for determining a geometric mean for the potential values, the potential map comprising the geometric mean for the potential values.

26. The computer-readable medium of claim 23, further comprising code for generating a label to be used to determine the potential map, wherein the code for generating the label comprises:

code for receiving an object mask for the image;

code for computing an inverted object mask from the object mask for the image;

code for determining a first distance transform from the inverted object mask;

code for determining a second distance transform from the object mask;

code for identifying foreground pixels in the image using the first distance transform; code for identifying background pixels in the image using the second distance transform; and code for generating the label based on the identified foreground pixels and the identified background pixels.

27. The computer-readable medium of claim 23, further comprising code for generating a label to be used to determine the potential map, wherein the code for generating the label comprises:

code for receiving an object mask for the image;

code for computing an inverted object mask from the object mask for the image;

code for shrinking the inverted object mask using a morphological thinning process;

code for shrinking the object mask for the image using the morphological thinning process;

code for generating an initial label based on the shrunk inverted object mask and based on the shrunk object mask for the image;

code for determining an initial potential map for the image using the initial label; and code for generating the label using the initial potential map, the shrunk inverted object mask, and the shrunk object mask.

28. The computer-readable medium of claim 23, wherein code for using the potential map to identify the boundary of the object comprises code for using the potential map to generate an image mask comprising:

program code for receiving at least two key points identifying an estimated boundary of the object;

program code for computing a label based on the at least two key points;

program code for cropping an image segment based on the label;

program code for determining a potential map from the image segment;

program code for creating boundary points from the potential map;

program code for responsive to receiving a command identifying the boundary points as being unacceptable, computing a second potential map using new key points, wherein the new key points comprises a greater number than the at least two key points; program code for responsive to receiving a command identifying the boundary points as being acceptable, outputting the boundary points; and program code for generated the image mask from the boundary points.

29. The computer-readable medium of claim 28, wherein the at least two key points identify the estimated boundary of the object in at least two image frames, wherein the boundary points identify the portion of the estimated boundary of the object in at least one image frame located between the at least two image frames.

30. A method comprising:

receiving an image having at least one object;

generating, by a computing device, at least two scale space images from the image, the computing device comprising a processor configured to cause the computing device to create the at least two scale space images, the at least two scale space images having different levels of detail;

using the at least two scale space images and potential values to determine a potential map by determining a geometric mean for the potential values, the potential map comprising the geometric mean for the potential values and representing a likelihood of whether pixels of the image are within a boundary of the object or outside the boundary of the object; and using the potential map to identify the boundary of the object.

* * * * *